(12) United States Patent
Gillespie

(10) Patent No.: US 9,555,603 B2
(45) Date of Patent: *Jan. 31, 2017

(54) PEELABLE FILM FOR CONTAINER LID

(71) Applicant: Berry Plastics Corporation, Evansville, IN (US)

(72) Inventor: Bryan Gillespie, Altoona, WI (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,049

(22) Filed: Feb. 8, 2016

(65) Prior Publication Data

US 2016/0152013 A1 Jun. 2, 2016

Related U.S. Application Data

(63) Continuation of application No. 14/211,969, filed on Mar. 14, 2014, now Pat. No. 9,254,628.

(60) Provisional application No. 61/800,251, filed on Mar. 15, 2013.

(51) Int. Cl.
| | |
|---|---|
| *B32B 27/08* | (2006.01) |
| *B32B 27/32* | (2006.01) |
| *B32B 27/30* | (2006.01) |
| *B32B 1/02* | (2006.01) |
| *B65D 65/40* | (2006.01) |

(52) U.S. Cl.
CPC ............... *B32B 27/08* (2013.01); *B32B 1/02* (2013.01); *B32B 27/306* (2013.01); *B32B 27/32* (2013.01); *B65D 65/40* (2013.01); *B32B 2250/24* (2013.01); *B32B 2270/00* (2013.01); *B32B 2307/306* (2013.01); *B32B 2307/31* (2013.01); *B32B 2307/746* (2013.01); *B32B 2435/00* (2013.01); *B32B 2439/00* (2013.01); *B32B 2439/40* (2013.01); *Y10T 428/2848* (2015.01); *Y10T 428/2878* (2015.01)

(58) Field of Classification Search
CPC ............ B32B 27/08; B32B 27/32; B32B 1/02; B32B 27/306; B32B 2439/40; B32B 2250/24; B65D 65/40
USPC ............... 220/359.3, 359, 359.1, 359.4, 265, 255.1,220/212, 214, 254.1, 256.1; 215/232, 12.1, 250
See application file for complete search history.

(56) References Cited

U.S. PATENT DOCUMENTS

| | | | | | |
|---|---|---|---|---|---|
| 4,194,039 | A | * | 3/1980 | Mueller | .................. B32B 27/32 156/229 |
| 4,377,616 | A | * | 3/1983 | Ashcraft | ................. B32B 27/08 156/229 |
| 4,561,920 | A | * | 12/1985 | Foster | ..................... B29C 47/06 156/244.11 |
| 4,578,316 | A | * | 3/1986 | Clauson | .................. B32B 27/32 156/244.11 |
| 4,604,322 | A | * | 8/1986 | Reid | ....................... B32B 27/32 428/332 |
| 4,833,024 | A | * | 5/1989 | Mueller | ............. B29C 61/0616 428/349 |
| 5,223,315 | A | * | 6/1993 | Katsura | .................. B29C 49/24 156/232 |
| 5,407,751 | A | | 4/1995 | Genske et al. | |
| 5,993,949 | A | * | 11/1999 | Rosenbaum | ........ B29C 47/0021 428/213 |

(Continued)

*Primary Examiner* — Robert J Hicks
*Assistant Examiner* — Kareen Thomas
(74) *Attorney, Agent, or Firm* — Barnes & Thornburg LLP

(57) ABSTRACT

A peelable multilayer film includes a seal layer (peel layer) and at least one core layer. The peelable multilayer film can bond to a container.

18 Claims, 3 Drawing Sheets

(56) References Cited

U.S. PATENT DOCUMENTS

| | | | |
|---|---|---|---|
| 5,998,019 A * | 12/1999 | Rosenbaum | B29C 47/0021 |
| | | | 428/345 |
| 7,314,669 B2 | 1/2008 | Galloway | |
| 2007/0287007 A1 | 12/2007 | Williams et al. | |
| 2013/0095335 A1 | 4/2013 | Hermel-Davidock | |
| 2014/0170344 A1 | 6/2014 | Pramanik et al. | |

* cited by examiner

PEELABLE FILM FOR CONTAINER LID

PRIORITY CLAIM

This application is a continuation of U.S. application Ser. No. 14/211,969, filed Mar. 14, 2014, which claims priority under 35 U.S.C. §119(e) to U.S. Provisional Application Ser. No. 61/800,251, filed Mar. 15, 2013, each of which is expressly incorporated by reference herein.

BACKGROUND

The present disclosure relates to peelable films, and particularly to films for use in packaging. More particularly, the present disclosure relates to packaging used in high-pressure pasteurization.

SUMMARY

According to the present disclosure, a peelable film is provided for sealing a container. The peelable film includes a first film laminated to a second film which is sealed to a rigid or semi-rigid container to form an article-receiving space therebetween and establish a hermetically sealed vessel.

In illustrative embodiments, a peelable film is laminated to a heat-resistant substrate (e.g., PET) prior to sealing to the rigid or semi-rigid container. In illustrative embodiments, the peelable film is a multilayer film, including a five-layer film. A multilayer film includes a seal layer and a core. The core comprises four polymer layers. In an embodiment, a vessel comprising a rigid or semi-rigid container and a peelable multilayer film is suitable for containing food to be processed by high-pressure pasteurization.

In illustrative embodiments, the seal layer of the film comprises polypropylene in the 4.6 MI range (Melt Index) in combination with a suitable slip component.

In illustrative embodiments, the skin layer is thin (e.g., as little as about 10% to as much as about 20% depending on the total thickness of the peelable film). One example in accordance with the present disclosure is about 15% of the thickness of the film.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 1:
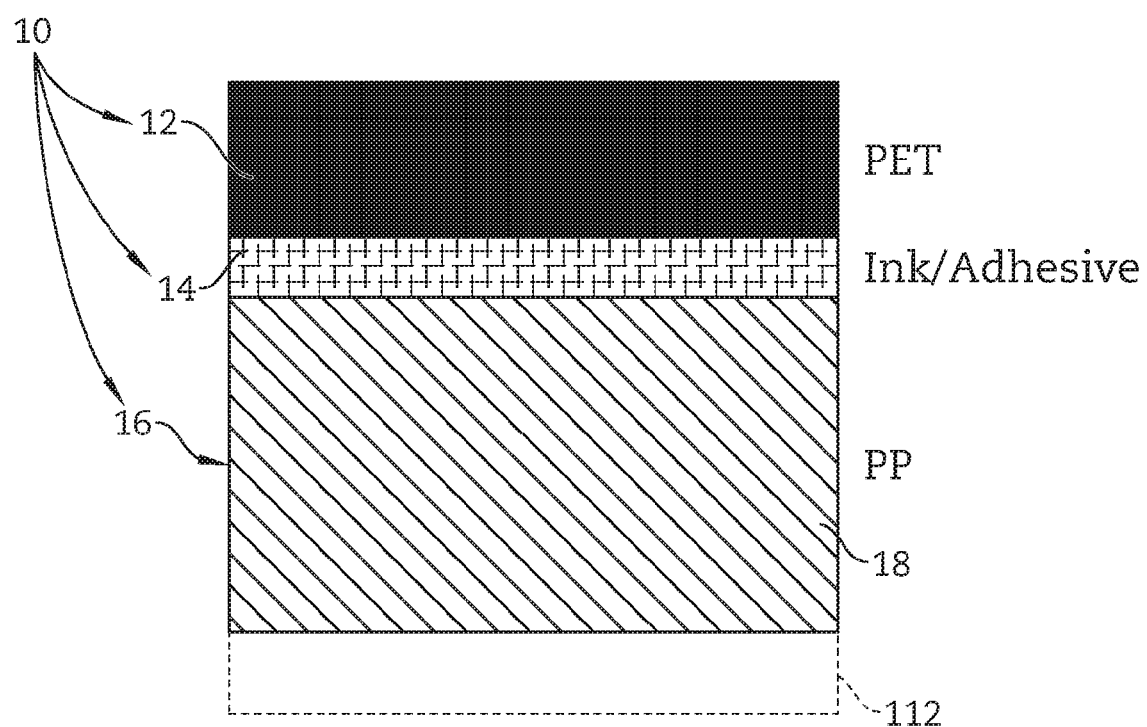
Figure 2:
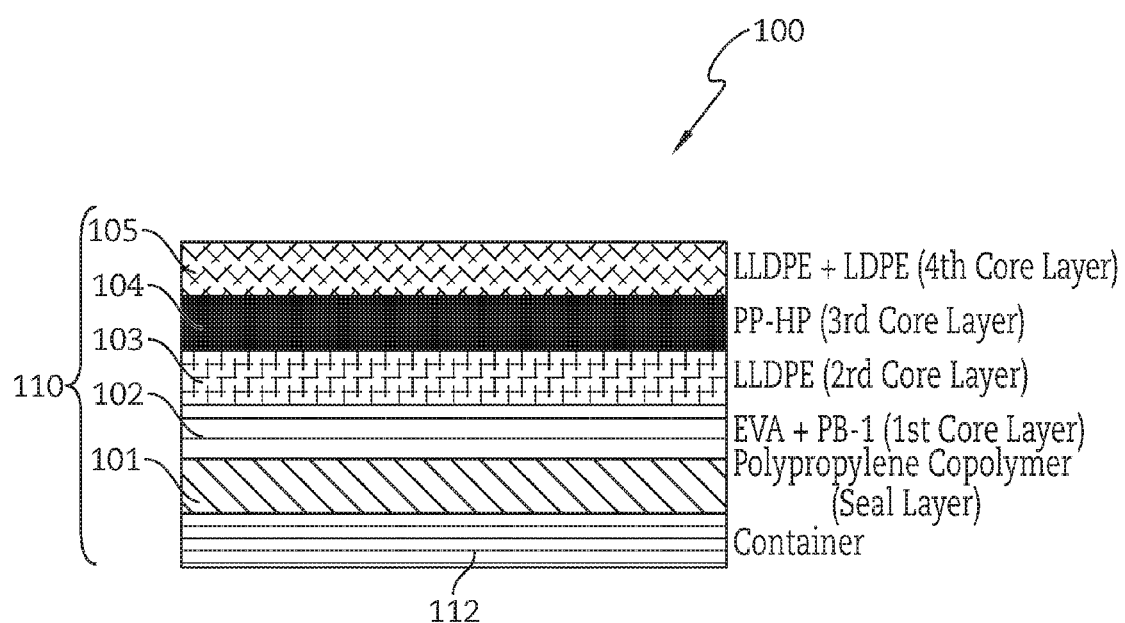
Figure 3:
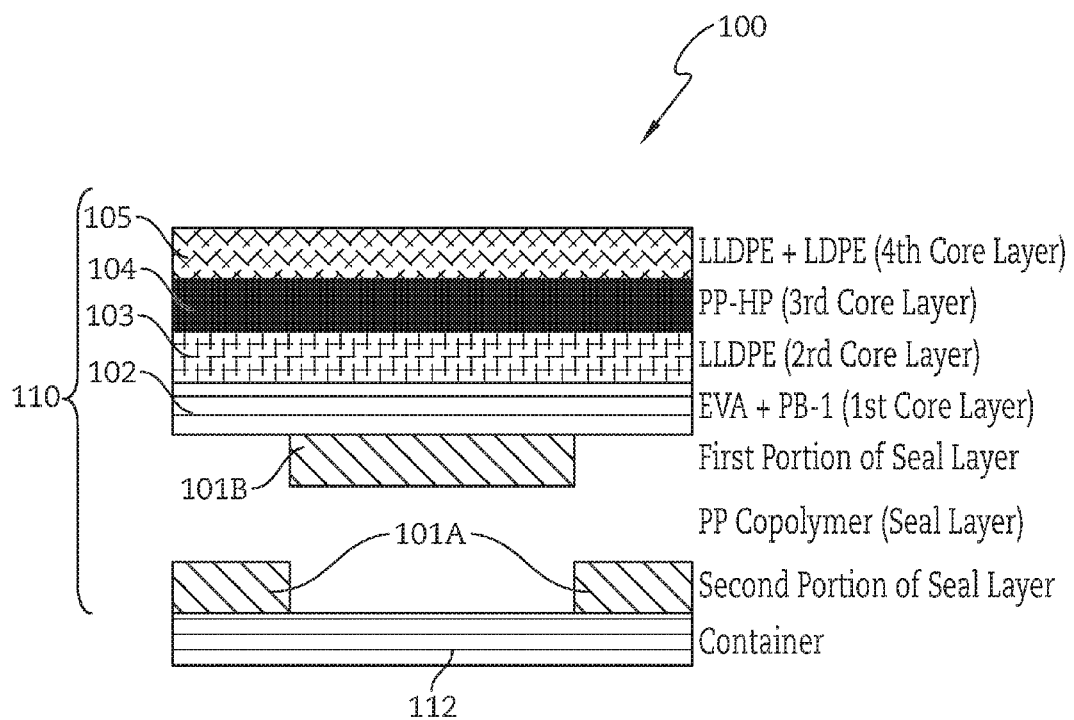

The detailed description particularly refers to the accompanying figures in which:

FIG. 1 is a diagrammatic view of a peelable film in accordance with the present disclosure showing that the peeleable film includes, from top to bottom, a PET layer, an ink/adhesive layer, and a multi-layer film comprising at least a polypropylene layer for use in a lidding application;

FIG. 2 is a diagrammatic view of container in accordance with the present disclosure showing the container prior to peeling that the container includes, from bottom to top, a container and a peelable five-layer film including, from bottom to top, a polypropylene copolymer seal layer, a first core layer including ethyl vinyl acetate and polybutene-1, a second core layer comprising LLDPE, a third core layer comprising a polypropylene homopolymer, and a fourth core layer comprising LLDPE and LDPE; and FIG. 3 is a diagrammatic view of the container of FIG. 2 after the peelable five-layer film has been peeled away from the container leaving a first portion of the polypropylene copolymer seal layer coupled to the container and a second portion of the polypropylene copolymer seal layer coupled to the first core layer.

DETAILED DESCRIPTION

A vessel in accordance with a first embodiment includes a rigid or semi-rigid container and a multi-layer lidding film comprising a peel layer adapted to be laminated to a substrate to form a receiving space. To access the receiving space, the seal layer tears away cleanly, without stringers and without unwanted delamination beyond a sealed area.

In a specific embodiment, a two-ply laminate flexible film of 48 gauge biaxially oriented polyethylene terephthalate (PET) is adhesively laminated to a five-layer film comprising a peel layer, wherein the peel layer is an exterior layer. A peel layer can include polypropylene copolymer. A peel layer can also include a slip agent.

A slip agent can include, but is not limited to, erucamide. In an embodiment, a slip agent includes, but is not limited to, about 1% to about 6% erucamide in LDPE, mLLD, or PP; about 1% to about 5.5% erucamide in LDPE, mLLD, or PP; or about 1% to about 5% erucamide in LDPE, mLLD, or PP. In an embodiment, a slip agent is about 5% to about 5.5% erucamide in LDPE. The layers of the multilayer film are arranged so that the seal layer adhesively fails or delaminates from the adjacent layer in the film. An adhesive fail or delamination allows the peel function of embodiments of a multilayer film when sealed to a rigid or semi-rigid container. A peel layer comprising polypropylene tears away cleanly, wherein no stringers or unwanted delamination is left beyond the sealed area.

Air quenched blown co-extruded film which is sealed directly to a rigid or semi-rigid container with sufficient seal strength to survive packaging, Pasteurization, and distribution. A package made in accordance with the present disclosure remains easy to open by the end user when the package contents are needed without stringers to contact the package contents. Further, seals made by the present disclosure provide consistent peelability over a broad operating range on packaging machinery.

In an embodiment, a vessel comprising a rigid or semi-rigid container and a multilayer film comprising a peel layer that forms a receiving space can contain food in that receiving space. A multilayer film as described herein maintains integrity and peelability after High-Pressure Processing (HPP). Food (e.g., potato salad) can be added to a vessel, sealed with a multilayer film as disclosed herein, and processed by HPP. Typical sterilization techniques are not used on food since the high heat affects the taste. However, HPP is able to kill bacteria without affecting taste since increase temperature is not utilized. Instead, HPP typically subjects a composition (e.g., food in a vessel) to about 80,000 to 100,000 psi or about 45,000 to about 87,000 psi for a period of time sufficient to kill bacteria. The increased pressure does not affect the taste of food.

The present disclosure takes advantage of the discovery that a co-extruded multi-layer film with a novel seal layer is capable of forming a peelable seal to a rigid or semi-rigid container. The seal provides a greater than about 800 g/in bond strength as measured by ASTM F88. An embodiment provides a bond strength of about 800 g/in to about 1600 g/in. Another embodiment provides a bond strength of about 800 g/in to about 1100 g/in. Yet another embodiment provides a bond strength of about 1200 g/in to about 1600 g/in.

One aspect of the present disclosure is that the peel layer is relatively thin. The seal layer can be about 10% to about 20%, about 12% to about 18%, about 14% to about 16%, and about 15% of the thickness of co-extruded multi-layer film. The dimensional contribution of the peel layer may be small, but the consequence of its inclusion leads to a significant improvement in the peelability properties of the multi-layer film. In this respect, the interposed skin layer's thickness contributes only slightly to the total thickness of the film, but substantially to the film's overall properties. While not being limited to any particular theory, it is believed that the combination of thickness, polymer melt index (in the range of about 4 to about 10), and polypropylene content of the peel layer in combination with a suitable slip agent contribute substantially to the peelability characteristics described herein.

As used herein, the term core refers to a layer configuration of one or more layers of polyolefin or plastic. The term core is used even for a single-layer configuration.

As used herein, the term layer is a planar arrangement of polyolefins or plastics which may or may not include multiple polyolefinic components. The term layer includes continuous planar arrangements, but is not limited to such arrangements. The term layer also includes discontinuous planar arrangements, for example, meshes, porous sheets, perforated sheets, and scrims.

Melt Index. As used herein, the term Melt Index (MI) is a measure of the ease of flow of a polymeric composition. MI equals the mass of polymer in grams flowing in 10 minutes through a capillary of specific diameter and length by an applied pressure. ASTM D-1238-00 refers to the standard test method for determining the melt index. MI is an indirect measure of molecular weight; a high melt index typically corresponds to low molecular weight. Furthermore, MI is a measure of the ability of the polymer composition to flow under pressure in its melted form. MI may be considered as inversely proportional to viscosity, but the viscosity is also dependent on the applied force.

Molecular Weight (MW). Many analytical techniques are available for the determination of the MW and MWD. One such approach is described in ASTM D 4001-93 (2006) which refers to the standard test method for determination of weight-average molecular weight of polymers by light scattering. Gel Permeation Chromatography (GPC) can provide information on the MW as well as the MWD. Another technique which may be used to determine the properties of one or more of the polymer compositions described herein includes Temperature Rising Elution Fractionation (TREF). Furthermore, GPC can be coupled with TREF to obtain other properties of a particular polymeric composition.

Density. Density values refer to those obtained according to ASTM D 1505-98, which is the standard test method for density of plastics by the density-gradient technique.

Branching. The extent to which a polymer is branched and the length of those branches may be determined by, for example, C-13 NMR, GPC, Temperature Rising Elution fractionation (TREF), and Crystallization Analysis Fractionation (Crystaf). Furthermore, rheological properties may be used to compare relative amounts of short and long chain branching. For example, relaxation time reflects the time taken for the polymer chains to relax after deformation in a molten condition. Another way to analyze the branching is through linear thermal shrinkage. A polymer in the form of a film or sheeting may be tested according to ASTM D 2732-96. ASTM D 2732 refers to the standard test method for unrestrained linear thermal shrinkage. Unrestrained linear thermal shrinkage, otherwise known as free shrink, refers to the irreversible and rapid reduction in linear dimension in a specified direction occurring in film subjected to elevated temperatures under conditions where nil or negligible restraint to inhibit shrinkage is present.

Short Chain Branching (SCB), as used herein, is branching of less than approximately 40 carbon atoms. One aspect of the present disclosure is the SCB may interfere with the formation of the microcrystalline structures. As used herein, Long Chain Branching (LCB) is branching with lengths longer than the average critical entanglement distance of a linear polymer chain. For example, long chain branching includes branching with chain lengths greater than 40 carbon atoms. Another aspect of the present disclosure is that a substantially linear polyethylene includes substantial SCB but substantially no LCB. Accordingly, substantially linear polyethylene may be referred to as substantially short chain branched polyethylene.

As used herein, substantially no long chain branching is defined as a LCB density of less than about 0.01 long chain branch points per 1000 main chain carbons. As used herein, some long chain branching is defined as a LCB density of about 0.01 to about 0.2 long chain branch points per 1000 main chain carbons. As used herein, substantial long chain branching is used to describe polymers having greater than 0.2 long chain branch points per 1000 main chain carbons.

ASTM standard test methods incorporated by reference. Reference is made to each ASTM standard test methods described herein, which ASTM standard test methods are hereby incorporated by reference herein, for disclosure relating to the methods for testing polymeric compositions and films made thereof.

Analytical Limitations. Another aspect of the present disclosure is that adjacent layers may be comprised of compositions which are substantially indistinguishable through analytical techniques. This aspect of the present disclosure results in multi-layer films which may have more layers than analytically perceivable. In one aspect, the present disclosure may involve introducing layers adjacent to each other which have very similar chemical and/or physical properties. The similarity of chemical and/or physical properties between the layers combined with the diminutive layer thickness may result in the number of layers perceived through analytical techniques being lower than the actual number of layers present.

LDPE. As used herein, Low Density Polyethylene (LDPE) is defined as a polyethylene polymer with a density in the range of about 0.91 g/cm to about 0.93 g/cm$^3$. LDPE may be polymerized through a free radical polymerization and has a high degree of short and long chain branching. The term LDPE is intended to include High Pressure Low Density Polyethylene (HPLDPE) polymerized through a high pressure free radical polymerization. For example, LDPE may be an ethylene homopolymer made using a free radical initiator at pressures from about 15,000 psi to about 50,000 psi and at temperature up to about 300° C. in a tubular or stirred reactor. According to this polymerization technique, numerous long chain branches may be formed along the length of the polymer. In one aspect, the LDPE may be characterized as having a single low melting point. For example, a 0.92 g/cm$^3$ density LDPE would typically have a melting point at about 112° C. In another aspect, LDPE may not pack into the crystal structures well. Therefore, LDPE may have a tendency to form amorphous solid structures. Accordingly, the intermolecular forces are weaker and the instantaneous-dipole induced-dipole attraction may be lower. Furthermore, LDPE has a lower tensile strength than HDPE but comparably greater ductility.

LLDPE. As used herein, Linear Low-Density Polyethylene (LLDPE) is used to describe a copolymer of ethylene and an alpha olefin comonomer made through a single site catalyzed reaction (e.g., through a metallocene catalyzed reaction (mLLDPE)), or Ziegler Natta catalysts. Included within the scope of this disclosure are physical blends of LLDPE with an elastomer or high pressure low density polyethylene. LLDPE, as used herein, includes polymers made through non-metallocene or post-metallocene catalyzed reactions resulting in a copolymer of ethylene and an alpha olefin copolymer. LLDPE includes copolymers made with various alpha olefin monomers including 1-butene, 3-methyl-1-butene, 1-propylene, 3-methyl-1-pentene, 1-hexene, 4-methyl-1-pentene, 3-methyl-1-hexene, 1-octene or 1-decene. The alpha olefin comonomer may be incorporated from about 1% to about 20% by weight of the total weight of the polymer. In other embodiments the alpha olefin comonomer may be incorporated from about 1% to about 10% by weight of the total weight of the polymer. LLDPE also includes copolymers incorporating long-chain branching (e.g. chains containing as many as 300 carbons). LLDPE also includes C6 and C8 LLDPE.

In illustrative embodiments, the film comprises LDPE having a MI of about 0.1 to about 20 g/10 min. In one embodiment, the film comprises LDPE having a MI of about 2 g/10 min. In another embodiment, the film comprises LDPE having a MI of about 0.2 g/10 min. In illustrative embodiments, the film comprises LDPE having a density of about 0.91 g/cm to about 0.93 g/cm$^3$. In another embodiment, the film comprises LDPE having a density of about 0.92 g/cm$^3$.

In illustrative embodiments, the film includes an ethylene-vinyl acetate (EVA) copolymer containing substantial long chain branching. In one embodiment, EVA is the type that is made using a high pressure process. For example, EVA may be manufactured through a free radical polymerization reaction between ethylene and vinyl acetate. In one embodiment, this polymerization may be performed in conventional stirred autoclave or tubular reactors at high pressure (in this context, greater than about 20,000 psi) and at high temperatures (in this context, from about 200-320° C.). In another embodiment, the molecular weight of EVA copolymers is controlled by the addition of chain terminators, such as propylene or isobutylene. In another embodiment, the type and level of branching of an EVA copolymer may be similar to that observed in LDPE. In another embodiment, from about 5 to about 50 weight percent (based on the total weight of the final EVA copolymer) vinyl acetate is copolymerized with ethylene. In yet another embodiment, the EVA copolymers have vinyl acetate content from about 2% to about 30%, about 2% to about 25%, about 2% to about 200%, about 2% to about 15%, about 2% to about 10%, about 2% to about 9%, about 2% to about 8%, about 2% to about 7%, about 2% to about 6%, or about 2% to about 5%, based on the total weight of the final EVA copolymer. In one embodiment, EVA copolymer comprises from about 5% to about 15% by weight copolymerized vinyl acetate and has a density from about 0.88 g/cm$^3$ to 0.912 g/cm$^3$ and melt indexes from about 0.5 to 10 g/l 0 min.

PP. In illustrative embodiments, one or more layers may comprise a polypropylene (PP). As used herein, the term polypropylene includes polymers with various molecular weights, densities, and tacticities synthesized from propylene monomers. The term PP is intended to include polymers which are homopolymers of propylene or copolymers of propylene or other lower or higher alpha olefins, such as ethylene. The term PP, within the scope of this disclosure, includes PP characterized as soft PP. In illustrative embodiments, the PP is a polypropylene homopolymer has a density of about 0.9 g/cm$^3$, and an MI of about 12 g/10 min.

cPE. As used herein, the term catalyzed polyethylene (cPE) is used generally to describe a copolymer of ethylene and an alpha olefin comonomer made through a catalyzed reaction (e.g., through a Ziegler-Natta, Philips, metallocene, or other single site catalyzed reactions). cPE includes polymers made through non-metallocene or post-metallocene catalyzed reactions resulting in a copolymer of ethylene and an alpha olefin copolymer. cPE includes copolymers made with various alpha olefin monomers including 1-butene, 3-methyl-1-butene, 3-methyl-1-pentene, 1-hexene, 4-methyl-1-pentene, 3-methyl-1-hexene, 1-octene or 1-decene. In one embodiment, the cPE is a copolymer of ethylene and one selected from the group of 1-hexene and 1-octene. In another embodiment, the cPE is a copolymer of ethylene and 1-octene.

VLDPE. As used herein, VLDPE is a cPE having a density of about 0.88 to about 0.92 g/cm$^3$ or from about 0.89 g/cm$^3$ to about 0.91 g/cm$^3$. It may be referred to as Ultra Low Density Polyethylene (ULDPE) or Very Low Density Polyethylene (VLDPE). VLDPE may have a MI of from about 0.5 to about 5 g/10 min, preferably from about 1 to about 4 g/10 min. For example, a VLDPE may have a density of about 0.91 g/cm$^3$ and a MI of about 3 g/10 min. Similarly, a VLDPE may have a density of about 0.90 g/cm$^3$ and a MI of about 4 g/10 min. A VLDPE having a density from about 0.90 to about 0.91 g/cm$^3$ and a MI of about 1 g/10 min may also be used. In one aspect, the characteristic density may have been achieved by copolymerizing ethylene with one of 1-butene, 1-hexene, 4-methyl-1-pentene, or 1-octene. In one embodiment, the VLDPE is a copolymer of ethylene and one comonomer selected from the group of 1-hexene and 1-octene. In another embodiment, the cPE is a VLDPE being a copolymer of ethylene and 1-octene, wherein copolymer has a mean comonomer percentage of about 10%.

While not being limited to a particular theory, the polymers herein may be blended in various ratios to obtain a polymeric blend having the desired properties for a given layer. The polymer blends may be formed by any convenient method, including dry blending the individual components and subsequently melt mixing, either directly in the extruder used to make the film.

A peelable co-extruded multi-layer film as described herein comprises a seal layer and a core. In an illustrative embodiment, a core comprises a first polymer layer, a second polymer layer, a third polymer layer, and a fourth polymer layer.

Seal layer. Again, without wishing to be bound by theory, it is believed that the combination of thickness, polymer melt index, and polyolefin content of seal layer, in combination with suitable slip, which can contribute substantially to the peelability characteristics described herein.

In illustrative embodiments, a seal layer comprises a polymer, e.g., polypropylene, as a base sealant having a MI of about 4.6. It is anticipated that MI may vary over a range, e.g., about 4 to about 10, about 4 to about 6, about 4 to about 5, and still impart desirable peel characteristics to co-extruded multi-layer film. Other exemplary polymers believed to have MI in this range include, but are not limited to, PA, VLDPE, LLDPE, HDPE, EVA copolymers, EP copolymers, PP homopolymers and copolymers, as well as combinations and mixtures thereof.

Core. A core comprises a first polymer layer, a second polymer layer, a third polymer layer, and a fourth polymer layer, each of which layer comprises one or more independently selected polymers such as, for example, polyethylene, polypropylene, polybutylene, and like polymers as well as copolymers, combinations, and mixtures thereof, cPE copolymers, PA, VLDPE, LDPE, LLDPE, HDPE, PIB, SBC, EAC, EMA copolymers, EEA copolymers, EBA copolymers, EVA copolymers, EP copolymers, PP homopolymers, and copolymers, as well as combinations and mixtures thereof. In one embodiment, a first polymer layer comprises EVA. In an embodiment, a second polymer layer comprises LLDPE. In an embodiment, a second polymer layer comprises mLLDPE. In an embodiment, a third polymer layer comprises a polypropylene. In an embodiment, fourth polymer layer comprises LLDPE.

In an embodiment, a seal layer is about 0.285 to about 0.315 mils, a first polymer layer is about 0.265 to about 0.295 mils, a second polymer layer is about 0.38 to about 0.42 mils, a third polymer layer is about 0.415 to about 0.465 mils, and a fourth polymer layer is about 0.550 to about 0.610 mils. In an embodiment, a seal layer is about 0.300 mils, a first polymer layer is about 0.280 mils, a second polymer layer is about 0.40 mils, a third polymer layer is about 0.440 mils, and a fourth polymer layer is about 0.580 mils.

In an embodiment, a multilayer film is a five-layer film. The first layer, which is the seal layer, comprises polypropylene. In an embodiment, the seal layer comprises polypropylene and a slip agent. In an embodiment, the seal layer comprises about 10% to about 20%, about 10% to about 16%, 10% to about 15%, 12% to about 16%, 12% to about 15%, or about 15% of the layer percent of the multilayer film. In an embodiment, the four non-seal layers form the core. The first core layer, which is in contact with the seal layer, comprises EVA and polybutene-1. In an embodiment, the three remaining layers may be any polymer (e.g., LDPE, LLDPE, HDPE, VLDPE, PP, PE, MDPE, HDPP, etc.) or blends thereof. In an embodiment, the second core layer comprises LLDPE. In an embodiment, the third core layer comprises polypropylene. In an embodiment, the fourth core layer comprises LDPE. In an embodiment, the fourth core layer comprises LLDPE. In an embodiment, the fourth core layer comprises LDPE and LLDPE. High barrier layers such as ethylene vinyl alcohol (EVOH) may be added to the core of the structure.

A peelable multilayer film in accordance with the present disclosure comprises a seal layer comprising a polypropylene copolymer and at least one core layer comprising ethyl vinyl acetate (EVA) and polybutene-1 (PB-1). The core layer comprising EVA and PB-1 is directly adjacent to the seal layer.

The peelable multilayer film comprises five layers. A second core layer comprises LLDPE. In illustrative embodiments, the second core layer comprises LDPE and LLDPE. A third core layer comprises polypropylene. A fourth core layer comprises LDPE and/or LLDPE.

In illustrative embodiments, the polypropylene copolymer has a melt index of about 4 to about 10. In an illustrative embodiment, the polypropylene copolymer has a melt index of about 4.6.

In illustrative embodiments, the seal layer further comprises a slip agent. The slip agent is erucamide in an illustrative embodiment.

In illustrative embodiments, a vessel comprises a container and a peelable multilayer film adhesively laminated to the container to form a receiving space. The film comprises a seal layer comprising a polypropylene copolymer that forms a peelable seal to the container and at least one core layer comprising ethyl vinyl acetate (EVA) and polybutene-1 (PB-1). The core layer comprising EVA and PB-1 is directly adjacent to the seal layer.

In illustrative embodiments, a substrate is PET. The PET is a laminate flexible film of biaxially oriented PET. The seal layer adhesively fails or delaminates from the adjacent layer.

In illustrative embodiments, the peelable seal has a bond strength of about 800 g/in to about 1600 g/in. In an illustrative embodiment, the peelable seal has a bond strength of about 800 g/in to about 1100 g/in. In an illustrative embodiment, the peelable seal has a bond strength of about 1200 g/in to about 1600 g/in.

A first embodiment of a laminate 10 in accordance with the present disclosure is shown, for example, in FIG. 1. Laminate 10 includes, from top to bottom, a substrate 12 (skin 12), an ink/adhesive layer 14, and a peelable multilayer film 16 comprising at least a polypropylene layer 18 for use in a lidding application. As shown in FIG. 1, substrate 12 is illustratively made from PET.

A second embodiment of a peelable five-layer film 110 in accordance with the present disclosure is shown in FIG. 2 prior to separation of peelable five-layer film 100 from a container 112. Together, peelable five-layer film 110 and container 112 cooperate to establish a vessel 100 and define a receiving space therebetween. Peelable five-layer film 110 is coupled to vessel 100, for example, via a heat seal or any other suitable alternative.

Peelable five-layer film 110 includes, from bottom to top, a polypropylene copolymer seal layer 101, a first core layer including ethyl vinyl acetate and polybutene-1 102, a second core layer comprising LLDPE 103, a third core layer comprising a polypropylene homopolymer 104, and a fourth core layer comprising LLDPE and LDPE 105 as shown in FIG. 2.

During peeling of peelable five-layer film 110 away from container 112, polypropylene copolymer seal layer 101 fractures into a first portion 101A that remains coupled to container 112 and a second portion 101B that remains coupled to first core layer 102 as shown in FIG. 3.

EXAMPLES

The following examples are set forth for purposes of illustration only. Parts and percentages appearing in such examples are by weight unless otherwise stipulated. All ASTM, ISO, and other standard test methods cited or referred to in this disclosure are incorporated by reference in their entirety.

Example I

Co-Extruded Multi-Layer Peelable Film

A multi-layer peelable sealant film was prepared using a conventional air quenched blown film co-extrusion process. The formulation of the co-extruded multi-layer peelable film is shown in Table 1.

TABLE 1

Co-extruded Multi-layer Peelable Film Formulation

Layer Information

| # | Sub-layer Type | Approximate Sub-layer Percentage | Approximate Resin Composition in Percentage | Resin Supplier | Resin Number | Resin Type |
|---|---|---|---|---|---|---|
| Layer formulation for multi-layer peelable film shown in FIG. 4A | Layer A/ Seal Layer | 15.0% | 98.5% | Total | 8473 | PP-Co. |
| | | | 1.5% | Ampacet | 10090 | 5% Eru. Slip |
| | Layer B | 14.0% | 85.0% | Dupont | 3170 | EVA 18% |
| | | | 15.0% | Bassell | PB8640M | PB |
| | Layer C | 20.0% | 85.0% | Exxon | 1018HA | LLDPE-C6 |
| | | | 15.0% | Exxon | 20-05CH | mLLDPE-C6 |
| | Layer D | 22.0% | 100.0% | Dow | H110-02N | PP-HP |
| | Layer E | 29.0% | 85% | Nova | FP120A | LLDPE-C8 |
| | | | 17.0% | Westlake | EF412AA | LDPE |
| | | | 3.0% | Ampacet | 102077 | AB-Clarity 10% |

Example II

Co-Extruded Multi-Layer Peelable Film

A multi-layer peelable sealant film was prepared using a conventional air quenched blown film co-extrusion process. The formulation of the co-extruded multi-layer peelable film is shown in Table 2.

arranged in the coex film so that the PP seal layer adhesively fails or delaminates from the adjacent layer in the structure. This design creates the peel function off the film when sealed to a rigid PP container. The PP seal layer tears away cleanly, blocking the formation of stringer or unwanted delamination beyond the seal area. The use of PP in the seal layer provides for higher temperature pasteurization without failure of the film due to temperature while still providing a peelable experience.

TABLE 2

Co-extruded Multi-layer Peelable Film Formulation

Layer Information

| # | Sub-layer Type | Approximate Sub-layer Percentage | Approximate Resin Composition in Percentage | Resin Supplier | Resin Number | Resin Type |
|---|---|---|---|---|---|---|
| Layer formulation for multi-layer peelable film shown in FIG. 4A | Layer A/ Seal Layer | 15.0% | 98.5% | Total | 8473 | PP-Co. |
| | | | 1.5% | Ampacet | 10090 | 5% Eru. Slip |
| | Layer B | 14.0% | 95.0% | Dupont | 3170 | EVA 18% |
| | | | 5.0% | Bassell | PB8640M | PB |
| | Layer C | 20.0% | 85.0% | Exxon | 1018HA | LLDPE-C6 |
| | | | 15.0% | Exxon | 20-05CH | mLLDPE-C6 |
| | Layer D | 22.0% | 100.0% | Dow | H110-02N | PP-HP |
| | Layer E | 29.0% | 85% | Nova | FP120A | LLDPE-C8 |
| | | | 57.0% | Westlake | EF412AA | LDPE |
| | | | 3.0% | Ampacet | 102077 | AB-Clarity 10% |

In on example, the lidding film of the present disclosure may be used on a container filled with hot dairy products. The use of PP based seal layer provides improved heat resistance above normal product fill temperatures. The PP based seal layer provides for heat resistance for high temperature filling up to 200 degrees Fahrenheit. The PP based seal layer also provides for relatively high seal initiation temperatures and a clean consistent delamination type peel mechanism off of PP rigid containers. The lidding film of the present disclosure also provides a solution to be used with high pressure processing. High burst strength and broad heat seal windows are also provided by the lidding film of the present disclosure.

The lidding film includes a 2-ply laminate film composed of 48 gauge biaxially oriented PET that is adhesive laminated to a five layer blown coextruded film. The layers are

TABLE 3

Typical Values for Peeling Film in Accordance with the Present Disclosure

| Property | Method | | Units | Value |
|---|---|---|---|---|
| Gauge | | | mils | 2.50 |
| Yield | | | sq inches/pound | 10,915 |
| Basis Weight | | | pounds/3000 sq ft | 39.6 |
| MVTR | ASTM 1249 | | g/100 sq in/day @100 F./90% rh | 0.3 |
| OTR 100% oxygen | ASTM D3985 | | cc/100 aq in/day @73 F./0% rh | 7.0 |
| Haze | ASTM D1003 | | Percent | 8 |
| Tensile, Ultimate | ASTM D882 | MD | psi | 8,350 |
| | | TD | psi | 8,750 |
| Elongation, Ultimate | ASTM D882 | MD | Percent | 125 |
| | | TD | Percent | 115 |
| 1% Secant Modulus | | MD | psi | 223,600 |
| | | TD | psi | 221,500 |

The invention claimed is:

1. A peelable multilayer film comprising
a seal layer comprising a polypropylene copolymer, wherein the polypropylene copolymer has a melt index of about 4 to about 10; and
at least one core layer comprising an ethyl vinyl acetate (EVA) and polybutene-1(PB-1),
wherein the core layer comprising the EVA and PB-1 is directly adjacent to the seal layer.

2. The film of claim 1, further comprising a second core layer comprising LLDPE, a third core layer comprising polypropylene, and a fourth core layer comprising LDPE.

3. The film of claim 1, further comprising a second core layer comprising LLDPE, a third core layer comprising polypropylene, and a fourth core layer comprising LLDPE.

4. The film of claim 1, further comprising a second core layer comprising LLDPE, a third core layer comprising polypropylene, and a fourth core layer comprising LDPE and LLDPE.

5. The film of claim 1 wherein the polypropylene copolymer has a melt index of about 4.6.

6. The film of claim 1, wherein the seal layer further comprises a slip agent.

7. A peelable multilayer film comprising
a seal layer comprising a polypropylene copolymer; and
at least one core layer comprising an ethyl vinyl acetate (EVA) copolymer and polybutene-1 (PB-1),
wherein the core layer comprising the EVA copolymer and PB-1 is directly adjacent to the seal layer,
wherein the EVA copolymer is at least about 85% by weight of the core layer.

8. The film of claim 7, wherein the EVA copolymer is about 85% to about 95% by weight of the core layer.

9. The film of claim 8, wherein the EVA copolymer is about 85% by weight of the core layer.

10. The film of claim 8, wherein the EVA copolymer is about 95% by weight of the core layer.

11. A peelable multilayer film comprising
a seal layer comprising a polypropylene copolymer; and
at least one core layer comprising an ethyl vinyl acetate (EVA) copolymer and polybutene-1 (PB-1),
wherein the core layer comprising the EVA copolymer and PB-1 is directly adjacent to the seal layer,
wherein the EVA copolymer is up to 95% by weight of the core layer.

12. The film of claim 11, wherein the EVA copolymer is about 85% to about 95% by weight of the core layer.

13. The film of claim 12, wherein the EVA copolymer is about 85% by weight of the core layer.

14. A peelable multilayer film comprising
a seal layer comprising a polypropylene copolymer; and
at least one core layer comprising an ethyl vinyl acetate (EVA) copolymer and polybutene-1 (PB-1),
wherein the core layer comprising the EVA copolymer and PB-1 is directly adjacent to the seal layer,
wherein the PB-1 is up to about 15% by weight of the core layer.

15. The film of claim 14, wherein the PB-1 is up to about 5% by weight of the core layer.

16. A peelable multilayer film comprising
a seal layer comprising a polypropylene copolymer; and
at least one core layer comprising an ethyl vinyl acetate (EVA) copolymer and polybutene-1 (PB-1),
wherein the core layer comprising the EVA copolymer and PB-1 is directly adjacent to the seal layer,
wherein the EVA copolymer comprises about 2% to about 30% by weight vinyl acetate.

17. The film of claim 16 wherein the EVA copolymer comprises about 2% to about 20% by weight vinyl acetate.

18. The film of claim 17 wherein the EVA copolymer comprises about 18% by weight vinyl acetate.

* * * * *